Jan. 1, 1935. C. G. ROYSTON 1,986,016
STITCH CUTTING IMPLEMENT
Filed Feb. 13, 1933
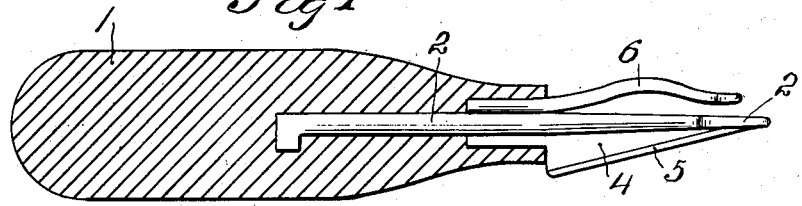
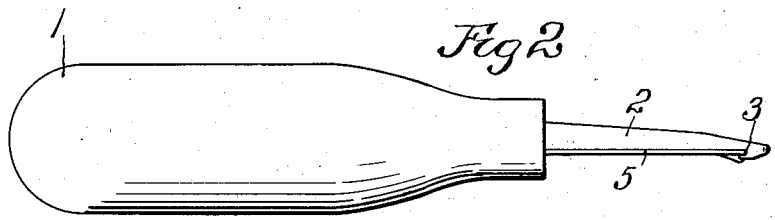
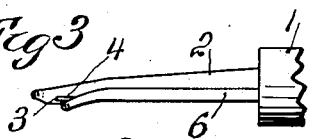
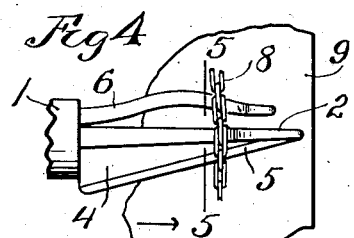
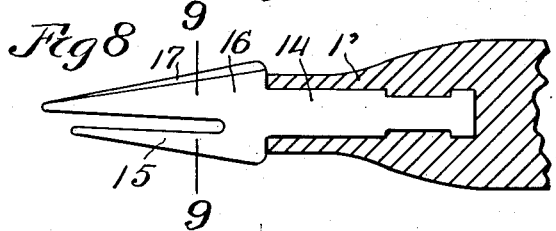
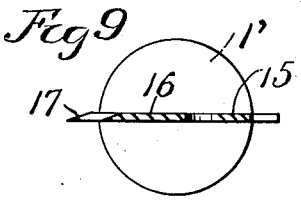
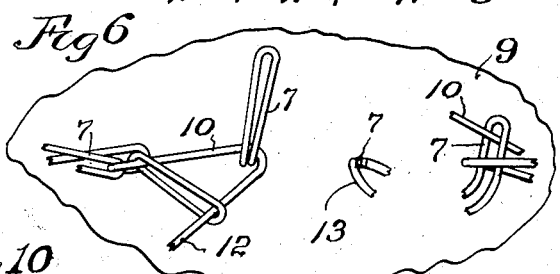
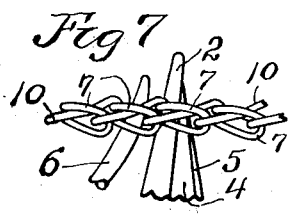
Witness
H. Vernon Olson
INVENTOR
Cecil G. Royston
BY Warren D. House
His ATTORNEY Patented Jan. 1, 1935

1,986,016

UNITED STATES PATENT OFFICE 1,986,016

STITCH CUTTING IMPLEMENT

Cecil G. Royston, Clay County, Mo.

Application February 13, 1933, Serial No. 656,439

1 Claim. (Cl. 30—14)

My invention relates to improvements in stitch cutting implements. It is particularly well adapted for use in severing lock stitches employed for closing the open ends of bags, so that the stitching can be readily and quickly raveled so as to open the bag.

The object of my invention is to provide a novel stitch cutting implement of the kind described, which is simple, cheap, durable, not likely to get out of order, and which may be easily, quickly and efficiently operated.

A further object of my invention is to provide a novel stitch cutting implement with which a needle thread loop and its engaging bobbin thread, of a lock stitch of usual type, may be severed and the cut end portions raised and freed from the sewed material and from each other, so as to enable the proper cut end portions being grasped for the purpose of raveling the threads.

The novel features of my invention are hereinafter fully described and claimed.

In the accompanying drawing which illustrates my invention,

Fig. 1 is a central longitudinal sectional view of one form of my improved stitch cutting implement, parts being shown in side elevation.

Fig. 2 is a side elevation of the implement shown in Fig. 1.

Fig. 3 a side elevation of a front portion of the implement shown in Fig. 1.

Fig. 4 is a plan view of the front end portion of the implement, shown in Fig. 1, engaged with stitching prior to the cutting operation, a portion of the sewed material being shown.

Fig. 5 is an enlarged vertical sectional view on the line 5—5 of Fig. 4.

Fig. 6 is an enlarged plan view of the severed stitching of the lock stitch type.

Fig. 7 is an enlarged plan view of the front end portion of the implement, shown in Fig. 1, partly inserted under the stitching to be cut.

Fig. 8 is a top view, partly broken away and partly in horizontal section of a modified form of my improved implement.

Fig. 9 is an enlarged section on the line 9—9 of Fig. 8.

Fig. 10 is an enlarged cross section of a modification of the blade shown in Figs. 8 and 9.

Similar characters of reference designate similar parts in the different views.

Referring to Figs. 1 to 7, 1 designates a handle in which is mounted a longitudinal arm 2, which extends forwardly from the handle and the under side of which is provided with a rearwardly facing recess 3. Fastened to the under side of the arm 2 is a flat blade 4 having a longitudinal rearwardly diverging cutting edge 5. The front end of the blade 4 is fitted in the recess or notch 3, Figs. 2 and 3. The arm 2 and blade 4 form a finger.

Fastened to the arm 2 at the side distant from the cutting edge 5 is another finger 6, spaced, as shown in Figs. 1, 4, 5 and 7, for a greater portion of its front part from the arm 2 and blade 4.

The two fingers are adapted to be inserted at opposite sides respectively of a stitch, as the needle thread loop 7 of a lock stitch, and between the stitching, designated generally by 8, and the material 9, which may be opposite upper portions of a bag, the open end of which is closed by the stitching.

As is well known, a lock stitching, commonly used for closing the open ends of bags of sugar, salt, grain meal, flour etc., comprises needle thread loops 7, which extend through the material sewn to one side thereof, at which side a bobbin thread 10 consecutively embraces and extends through the loops 7 of the needle thread 11.

In the use of the implement, the fingers are passed under the stitching 8 and at opposite sides of one of the loops 7. The cutting edge 5 will first sever the loop 7 next to the right, as viewed in Figs. 5 and 7, after which it will sever the bobbin thread 10. The implement is then raised so as to pull upwardly on the stitching, thus freeing the left cut end portion of the bobbin thread, designated in Fig. 6 by 12, from the loop 7 which was between the fingers.

By now pulling on the cut bobbin thread portion 12 and upon the left cut end portion, designated in Fig. 6 by 13, of the needle thread, the stitching may be ravelled to the left, as viewed in Figs. 5, 6 and 7, so as to open that portion of the bag or other stitched article.

In the form shown in Figs. 8 and 9, the handle 1' has embedded in one end a flat blade 14 having two forwardly projecting fingers 15 and 16 adapted to be extended between the stitching 8 and the bag material 9 and at opposite sides respectively of one of the needle thread loops 7, in the same manner as has been described with respect to the other form of my invention.

The finger 16 is provided at the edge distant from the finger 15 with a longitudinal rearwardly diverging cutting edge 17, which, when the fingers are forced inwardly under the stitching 8, severs the loop next adjacent thereto and the bobbin thread, after which the implement is raised from the bag material 9, thus releasing the severed portions of the needle thread and the bobbin thread from each other, after which the stitching may be ravelled, in the manner already described by pulling on the left cut end portions of the severed threads.

To facilitate the operation of severing the threads, the blade 14′, corresponding to the blade 14, and shown in Fig. 10, may have the fingers 15′ and 16′, corresponding to the fingers 15 and 16, which may be raised or ribbed lengthwise, the finger 16′ being provided with a cutting edge 17′. In other respects the blade 14′ will correspond in structure to the blade 14.

As shown in Fig. 2, the front end of the arm 2 is blunt and projects in front beyond the cutting edge 5. This prevents liability of the cutting edge cutting the cloth when the finger having the cutting edge is being inserted between two of the stitches. It will also be noted that the arm 2 rises upwardly and rearwardly from in front of the front end of the cutting edge 5, Figs. 2 and 5, so that the arm will lift the heavy seam and pull the thread 7 which extends through the cloth tight before the cutting edge 5 enters far enough to endanger cutting one of the threads above, and to enable the thread 7 to be easily cut.

As shown in Figs. 1, 3 and 4, the arm 2 at its front end projects a substantial distance forward of the finger 6. This enables the operator to without delay readily insert the fingers between the proper stitches, and without having to take considerable care in making the insertion, as would have to be done with the fingers equally projecting, it being necessary, with one finger longer than the other, to merely keep the eyes on the longer finger, the other readily follows, after the insertion of the first one.

As shown in Fig. 3, the front end of the finger 6 is turned forwardly downwardly below the horizontal plane of the cutting edge of the blade 4. This reduces the liability of the finger 6 passing above the threads 10 and 11, and insures its prying its way under these threads when inserted, which is essential.

I do not limit my invention to the structures shown and described as many modifications, within the scope of the appended claim, may be made without departing from the spirit of my invention.

What I claim is:—

A stitch cutting implement having two fingers adapted to receive between them a stitch and having their outer edges rearwardly diverging, one of said fingers projecting a substantial distance forwardly beyond the other and having a rearwardly diverging cutting edge portion and a rounded front end forward of said cutting edge portion, and having a longitudinal raised portion extending continuously rearwardly from said rounded end and adapted to lift and tighten the stitching before said cutting edge portion contacts with and cuts the latter.

CECIL G. ROYSTON.